United States Patent [19]

Charles

[11] Patent Number: 5,391,028
[45] Date of Patent: Feb. 21, 1995

[54] METHOD FOR REDUCING RADAR CROSS-SECTION OF AIRCRAFT FASTENERS, AND FASTENER ASSEMBLIES FOR USE THEREIN

[75] Inventor: James F. Charles, Sun City, Calif.

[73] Assignee: Northrop Grumman Corporation, Los Angeles, Calif.

[21] Appl. No.: 60,943

[22] Filed: May 12, 1993

[51] Int. Cl.⁶ ............... F16B 19/00; F16B 35/02; B64C 1/12
[52] U.S. Cl. .................... 411/374; 411/383; 411/910; 244/1 A; 244/132
[58] Field of Search ................ 411/372–374, 411/377, 383, 384, 397, 429, 910; 244/1 A, 131, 132; 29/525.1

[56] References Cited

U.S. PATENT DOCUMENTS

| | | | |
|---|---|---|---|
| 294,524 | 3/1884 | Stiemke | 411/374 |
| 4,630,168 | 12/1986 | Hunt | 361/218 |
| 4,711,760 | 12/1987 | Blaushild | 411/910 X |
| 4,884,929 | 12/1989 | Smith et al. | 411/377 X |
| 4,905,931 | 3/1990 | Covey | 244/1 A |
| 4,964,594 | 10/1990 | Webb | 244/132 X |
| 5,016,015 | 5/1991 | Novak et al. | 342/2 |

FOREIGN PATENT DOCUMENTS 920221  3/1963  United Kingdom ............ 411/377

*Primary Examiner*—Neill R. Wilson
*Attorney, Agent, or Firm*—Terry J. Anderson; Karl J. Hoch, Jr.

[57] ABSTRACT

Novel fastener assemblies self-conforming to contoured surface panels being fastened to support members and minimizing radar cross-section by providing a non-reflective surface shield component over the basic fastening component or bolt. The invention provides a method for reducing the amount of microwave radiation normally reflected back to its source by aircraft panel fasteners or bolts and/or by the recessed walls of bolt access openings at contoured surface areas. The invention comprises a novel fastener assembly of a threaded shield bolt engaged within a main fastening bolt, the shield bolt having a flexible, surface-conforming head of a metal alloy having high temperature stability properties.

12 Claims, 1 Drawing Sheet

METHOD FOR REDUCING RADAR CROSS-SECTION OF AIRCRAFT FASTENERS, AND FASTENER ASSEMBLIES FOR USE THEREIN

GOVERNMENT LICENSE RIGHTS

The U.S. Government has a paid-up license in this invention and the right in limited circumstances to require the patent owner to license others on reasonable terms as provided for by the terms of contract F33657-81-C-0067 awarded by the U.S. Air Force.

BACKGROUND OF THE INVENTION

1. Field of the Invention

This invention relates to reducing or solving the problems presented by exposed panel fasteners and/or fastener recesses at the outer surfaces of aircraft, particularly high speed aircraft designed to have a low radar cross-section or low ability to reflect radar back to its source. Such aircraft are covered by replaceable surface panels of radar-absorbing material (RAM), which panels are bolted to underlying support members by means of fasteners, such as internally threaded Milson sleeve bolts which threadably engage threaded shanks extending outwardly from the support surface in predetermined locations corresponding to the locations of the fastener passages or bores on the surface panels. The head of each hollow, tubular Milson sleeve bolt has a recessed hexagonal opening which permits the sleeve bolts to be tightened in place by means of a hexagonal tool. The recessed hexagonal openings of the sleeve bolts represent sharp-edged surface irregularities which increase the radar cross-section of the aircraft surface.

While the Milson sleeve bolts are hollow and have a minimal exposed outer surface for the reflection of microwaves, such reflection is increased in contoured areas of the surface panels where the fasteners are recessed to expose relatively large portions of the walls of the fastener bores in the surface panels, which exposed portions also represent sharp-edged, surface irregularities which increase the radar cross-section of the aircraft.

In view of the variety of surface contours of aircraft panels, it is not possible to manufacture fasteners having exposed surface areas which will conform to the different contours of surface panels applied to different areas of the aircraft, or to different aircraft having different surface contours. Also, in view of the strength requirements and specifications of the fastening operation, and the exposure of the outer surfaces of the fasteners to high temperatures during high speed operation of the aircraft, which requires resistance to melting, oxidation and sulfidation, it is readily apparent that the problems solved by the present invention are multifaceted.

2. Discussion of the Prior Art

There are no known fasteners for solving the problems overcome by the present invention. It is known to apply surface coatings or skins over the outer surface of aircraft panels of RAM materials to minimize reflection of microwaves by the aircraft back to a receiver, and reference is made to U.S. Pat. No. 5,016,015 issued May 14, 1991.

It is also known to increase the resistance of metal aircraft panel fasteners to attract and conduct lightening by inserting non-metallic, dielectric caps or covers into the fastener bores to cover the recessed fasteners, provide a continuous aerodynamic surface and permit the surface to receive a crack-free coat of paint. The inserts may be of premolded plastic, shaped to fill the bores, or of liquid filler or sealant which flows to fill the holes. Reference is made to U.S. Pat. No. 4,630,168 issued Dec. 16, 1986.

Finally, reference is made to U.S. Pat. No. 294,524, issued Mar. 4, 1884, which has no relationship to the problems solved by the present invention but which discloses fastener assemblies having some structural features similar to the fastener assemblies of the present invention.

SUMMARY OF THE INVENTION

The present invention minimizes or solves the microwave reflection problems presented by exposed fastener bores, representing sharp-edged surface irregularities on RAM aircraft panels, by providing novel fastener assemblies comprising an inner fastening component and an outer, threadably-engaged shield component having sufficient resiliency or flexibility to conform to contoured surfaces of the RAM panels when the shield component is tightened in place into the fastening component to form a smooth cover over each fastener bore. The shield component comprises a threaded shank section which is formed integral with, or is welded to, a head section comprising a relatively thin, flexible disc which is capable of flexing or distorting to conform to the outer contoured surfaces of the RAM panels. The shield component, or at least the flexible disc head section thereof is formed from metal alloy having the required high temperature strength and corrosion-resistance properties.

THE DRAWINGS

Figure 1:
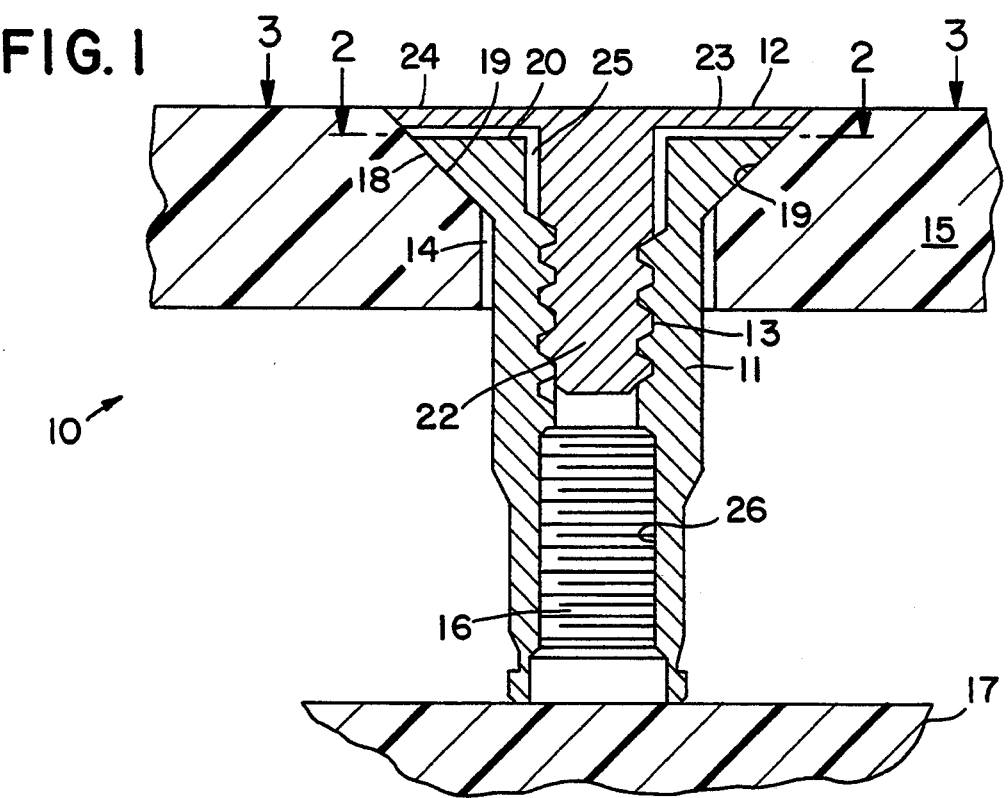
FIG. 1 is diagrammatic cross-section of a fastener assembly according to an embodiment of the present invention shown in final position uniting an outer surface panel, such as a RAM panel, to a support structure.
Figure 4:
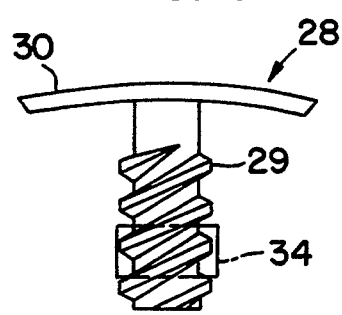
Figure 3:
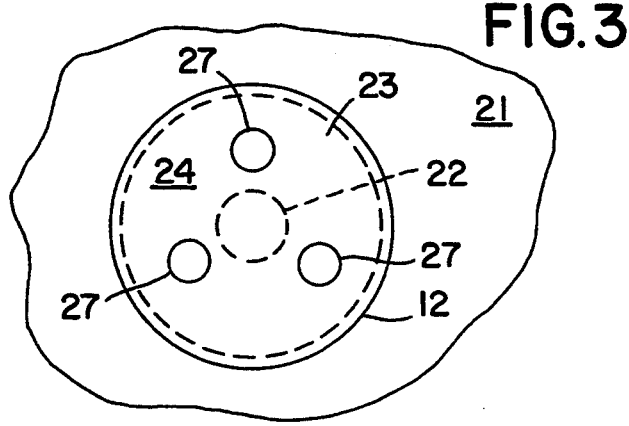

FIG. 3 is a view of the outer shield component taken along the line 3—3 of FIG. 1; and FIG. 4 is a side view of an outer shield component of a fastener assembly according to an embodiment of the present invention, the outer disc portion being preformed in rounded or curved configuration to facilitate conformation with a bore hole surface which is similarly rounded or curved, or flat, when tightened thereagainst and the shank portion containing a plastic insert for locking purposes.

DETAILED DESCRIPTION OF THE INVENTION

Referring to the drawing, the fastener assembly 10 of FIG. 1 comprises a modified Milson panel fastener or inner sleeve bolt 11 and an outer shield bolt 12 threadably engaged within an upper internal thread 13 formed within the sleeve bolt 11. The sleeve bolt 11 is inserted within an attachment bore 14 of a surface panel 15 and threadably-engaged over a support shank 16 fixed to the support member 17 to fasten the surface panel 15 to the support member 17. It will be understood that each surface panel 15 has a plurality of preformed bores 14 in predetermined locations corresponding to the locations of a corresponding number of support shanks 16 present on the support member 17, and that a fastener assembly sleeve bolt 12 is attached within each said bore 14.

As shown by FIG. 1, each attachment bore 14 in the surface panel 15 has a conical countersink opening 18 which extends a sufficient distance into the thickness of the panel 15 that the mating conical head 19 of the sleeve bolt 11 can be tightened into position in which the flat upper surface 20 of the sleeve bolt 11 is recessed below the outer surface 21 of the surface panel 15 by at least a predetermined distance. The purpose of the recess is to accommodate the outer shield bolt 12.

For convenience purposes, the present assemblies may comprise a conventional Milson sleeve bolt which is modified by providing it with the upper internal thread 13 for engagement with the threaded shank 22 of a novel shield bolt 12 comprising a relatively thin, flexible shield head 23 of high temperature-resistant material. The shield head 23 has an outer diameter slightly smaller than the outer diameter of the conical opening 18 of the bore 14 of the surface panel 15 and the shield head 23 is tapered around its periphery so as to nest within the opening 18 when tightened to a position in which its outer surface 24 is level with the outer surface 21 of the panel 15.

Figure 2:
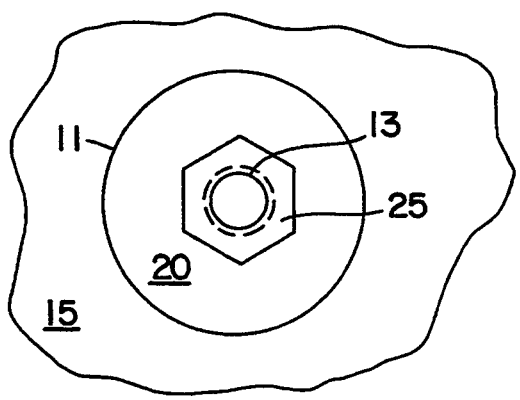
FIG. 2 is a view of the inner fastening component or sleeve bolt taken along the line 2—2 of FIG. 1.

As illustrated most clearly by FIG. 2, the sleeve bolt 11 of FIG. 1 has a hollow core comprising a recessed hexagonal opening 25, for receiving a hexagonal male wrench or Allen wrench for turning the bolt 11 during attachment or detachment, an upper internal thread 13 for engagement with the shield bolt 12, and a lower internal thread 26 for engagement with the support shank 16.

As illustrated most clearly by FIG. 3, the upper surface 24 of the head 23 of the shield bolt 12 is provided with shallow spaced holes 27 to facilitate the turning and tightening or removal of the shield bolts by means of a companion 3-point wrench. Such tightening, coupled with the flexibility of the thin head 23, causes the bevelled edge of the head 23 to nest within the conical countersink 18 at the outer surface 21 of the top panel whereby the head 23 flexes and/or pivots so that the outer surface 24 of the head 23 conforms to the plane of the outer surface 21 of the top plate 15.

FIG. 4 illustrates a shield bolt suitable for use according to the present invention. The shield bolt 28 of FIG. 4 has a flexible head 30 which is curved downwardly and is designed for attachment over relatively flat or curved surfaces of top plates. When tightened, the bevelled edge of the head engages the entrance bevel of opening 18 to cause the flexible head portion 30 to conform to the outer surface 21 of the surface panel 15.

Most preferably the shank portion 29 of the bolt 28 is self-locking against vibration-loosening, such as due to the presence of a transverse soft plastic insert 31 within a transverse bore in the threaded area of the shank 29, such as nylon.

It will be apparent that the application and tightening of the present shield bolts masks or shields the reflective composition and reflective configuration of the sleeve bolts and provides a smooth continuous outer surface for the surface panels, which surface is less reflective of radar. Also, the present shield bolts preferably are formed of materials or metal superalloys which are more resistant to high temperature erosion, corrosion and sulfidation, thereby protecting the sleeve bolts.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

I claim:

1. A fastener assembly comprising a lower bolt section for insertion into a surface bore of a surface plate to fasten the surface plate to a support member, and an upper shield bolt of composition different from that of said lower bolt section, said lower bolt section having a head adapted to be recessed below an outer surface of the surface plate, and having a receptive bore at a center of said head, and said upper shield bolt being engagable within the receptive bore of said lower bolt section and having a thin flexible head portion adapted to engage the surface bore of the surface plate proximate said outer surface of the surface plate, and adapted to flex into planar conformity with the outer surface of the surface plate when the upper shield bolt is tightened into said lower bolt section to cover the surface bore and shield the lower bolt section.

2. A fastener assembly according to claim 1 in which the receptive bore of each said lower bolt section comprises a threaded receptive bore, and each said upper shield bolt comprises a threaded shank for engagement with said threaded receptive bore.

3. A fastener assembly according to claim 1 in which the thin flexible head portion of each said upper shield bolt comprises a bevelled edge which is adapted to engage a bevelled entrance of each said surface bore.

4. A fastener assembly according to claim 2 in which the threaded shank of each said upper shield bolt comprises means for vibration-resistant locking engagement of said threaded shank within the threaded receptive bore of each said lower bolt section.

5. A fastener assembly according to claim 4 in which each said locking means comprises a transverse plastic insert at a threaded area of said threaded shank.

6. A fastener assembly according to claim 1 wherein said thin flexible head portion of each said upper shield bolt is formed from a metal alloy having high temperature strength and corrosion-resistance properties.

7. Method for masking the composition and configuration of attachment bolts at an outer surface of a surface plate fastened to a support member by means of said bolts, comprising: providing a head of each said attachment bolt with a receptive central bore; recessing each of said attachment bolts below the outer surface of said surface plate within a surface bore; fastening to the receptive central bore of each said attachment bolt a shield bolt comprising a thin flexible head for engagement with said surface bore proximate said outer surface, and tightening each said shield bolt into each said attachment bolt to cause each said thin flexible head to engage the surface bore of said surface plate proximate said outer surface and to flex into planar conformity with the outer surface of said surface plate and cover each said surface bore and each said attachment bolt with a smooth surface-conforming shield.

8. Method according to claim 1 which comprises providing the head of each said attachment bolt with a threaded receptive central bore, and providing each said shield bolt with a threaded shank for engagement with said threaded receptive central bore.

9. Method according to claim 1 which comprises providing each said surface bore of said surface plate with a bevelled entrance, and providing the thin flexible head of each said shield bolt with a bevelled edge which engages the bevelled entrance of each said surface bore.

10. Method according to claim 8 in which the threaded shank of each said shield bolt comprises means for vibration-resistant locking engagement with the threaded receptive central bore of each said attachment bolt.

11. Method according to claim 10 in which each said locking means comprises a transverse plastic insert at a threaded area of said threaded shank.

12. Method according to claim 1 wherein said thin flexible head of each said shield bolt is formed from a metal alloy having high temperature strength and corrosion-resistance properties.

* * * * *